(12) United States Patent
Rabhi

(10) Patent No.: US 10,890,133 B2
(45) Date of Patent: Jan. 12, 2021

(54) MAGNETIC VALVE RECOIL DEVICE

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 0 days.

(21) Appl. No.: 16/564,285

(22) Filed: Sep. 9, 2019

(65) Prior Publication Data
US 2020/0080508 A1 Mar. 12, 2020

Related U.S. Application Data

(60) Provisional application No. 62/729,243, filed on Sep. 10, 2018.

(51) Int. Cl.
| | |
|---|---|
| *F02D 41/30* | (2006.01) |
| *F02B 17/00* | (2006.01) |
| *F16K 31/06* | (2006.01) |
| *F02B 19/10* | (2006.01) |
| *F02D 41/20* | (2006.01) |

(52) U.S. Cl.
CPC .......... *F02D 41/3023* (2013.01); *F02B 17/00* (2013.01); *F02B 19/1033* (2013.01); *F02D 41/3094* (2013.01); *F16K 31/0624* (2013.01); *F02D 2041/2044* (2013.01)

(58) Field of Classification Search
CPC ............. F02D 41/3023; F02D 41/3094; F02D 2041/2044; F02B 17/00; F02B 19/02; F02B 19/10; F02B 19/1023; F02B 19/108; F02B 19/1033; F02B 19/1042; F02B 19/1047; F16K 31/0624
USPC ........................................................ 123/292
See application file for complete search history.

(56) References Cited

U.S. PATENT DOCUMENTS

| | | | | |
|---|---|---|---|---|
| 3,710,764 A | * | 1/1973 | Jozlin ..................... | H01T 13/54 123/266 |
| 4,103,648 A | * | 8/1978 | Jarry ....................... | F02B 21/00 123/316 |
| 4,210,105 A | * | 7/1980 | Nohira ..................... | F02B 3/02 123/277 |
| 4,424,780 A | * | 1/1984 | Trucco .................... | F02B 19/02 123/255 |
| 4,867,200 A | * | 9/1989 | Markley ................ | F16K 15/028 137/515.7 |
| 4,892,070 A | * | 1/1990 | Kuhnert .................. | H01T 13/54 123/274 |
| 5,080,060 A | * | 1/1992 | Huang ................... | F02M 69/08 123/275 |

(Continued)

FOREIGN PATENT DOCUMENTS

| | | |
|---|---|---|
| FR | 3060222 A1 | 6/2018 |
| FR | 3061743 A1 | 7/2018 |
| WO | 2018/104681 A1 | 6/2018 |

*Primary Examiner* — Sizo B Vilakazi
*Assistant Examiner* — Anthony L Bacon
(74) *Attorney, Agent, or Firm* — Nixon & Vanderhye

(57) ABSTRACT

The magnetic valve recoil device is intended for a valve-type ignition pre-chamber having a stratification cavity connected by a stratification pipe, which a stratification valve can close, to a combustion chamber housing a primary charge, a stratification injector, and an ignition unit leading to the cavity in order to inject and ignite an initiator charge so as to ignite the primary charge via a torch ignition pre-chamber formed by the stratification valve with the stratification pipe when it is not closing the latter, the valve being otherwise kept in contact with the pipe by a magnetic field created by a magnetic field source.

8 Claims, 6 Drawing Sheets

(56) References Cited

U.S. PATENT DOCUMENTS

| | | | |
|---|---|---|---|
| 5,454,356 A * | 10/1995 | Kawamura | F02D 41/401 |
| | | | 123/254 |
| 5,603,298 A * | 2/1997 | Kawamura | F02B 19/02 |
| | | | 123/254 |
| 2013/0180498 A1* | 7/2013 | Rabhi | F02D 41/3023 |
| | | | 123/295 |
| 2015/0204232 A1* | 7/2015 | Hanson | F02B 19/108 |
| | | | 123/275 |
| 2016/0069250 A1* | 3/2016 | Loetz | F02B 19/108 |
| | | | 123/292 |
| 2016/0333770 A1* | 11/2016 | Kreuter | F02B 19/108 |

* cited by examiner

MAGNETIC VALVE RECOIL DEVICE

BACKGROUND OF THE INVENTION

Field of the Invention

The purpose of the present invention is a magnetic valve recoil device intended for a valve-type ignition pre-chamber or, secondarily, for a spark plug with a shuttle electrode, said pre-chamber and said spark plug being intended to ignite a primary charge introduced into the combustion chamber of an internal combustion engine by means of an initiator charge ignited by a spark.

Description of the Related Art

There is known patent application No. FR 1750264 referring to a valve-type ignition pre-chamber, published on Jun. 14, 2018, and patent application No. FR 1662254 referring to a shuttle-electrode spark plug, published on Jul. 13, 2018. These two patent applications belong to the applicant.

The inventions of patent applications FR 1750264 and FR 1662254 apply to any reciprocating engine with spark ignition, regardless of the type, in which the primary charge is highly diluted with fresh air or with recirculated and precooled exhaust gases. The dilution of the primary charge with fresh air or cooled exhaust gases makes it possible to increase the average and/or maximum thermodynamic efficiency of said motor and therefore to reduce the fuel consumption of said motor for the same amount of work produced.

The objective of said inventions is to achieve reliable ignition and rapid combustion of the highly diluted primary charges, with the desired efficiency gains only being possible with such an ignition and such a combustion.

The devices described in patent applications FR 1750264 and FR 1662254—although each producing a different result—are based on a similar underlying principle. For the sake of convenience, we will focus here on the valve-type ignition pre-chamber referred to in patent application No. FR 1750264.

Note that according to patent application No. FR 1750264, the combustion chamber of the spark-ignition reciprocating engine to which the invention is applied is connected to a stratification cavity made in the cylinder head of said motor via a stratification pipe.

A stratification injector terminates in said stratification cavity, into which it can inject an initiator charge consisting of a readily inflammable oxidizer and gaseous fuel mixture pre-pressurized by compression means. Said initiator charge is used to trigger the combustion of a primary charge after the primary charge has been introduced into the combustion chamber of the spark-ignition reciprocating engine by at least one intake valve and then compressed.

Triggering of the combustion of the primary charge takes place by igniting the initiator charge by ignition means, which may be in the form of a known spark plug per se while an electric arc may be formed between the two electrodes of said spark plug.

In order to give as much efficiency as possible to the energy released by combustion of the initiator charge to trigger combustion of the primary charge, the invention of patent application No. FR 1750264 calls for a stratification valve.

Said valve may either come into contact with a valve closing seat made in the stratification pipe in order to close off said pipe and seal off the stratification cavity from the combustion chamber, or it may come into contact with a valve opening seat also made in the stratification pipe and form a torch ignition pre-chamber by which the stratification cavity is made to communicate with the combustion chamber via gas ejection orifices leading to said chamber.

One notes from a reading of patent application No. FR 1750264 that it is the difference in pressure between the stratification cavity and the combustion chamber that causes the valve to rest on the valve closing seat or on the valve opening seat.

Indeed, if the pressure in the combustion chamber is greater than the pressure in the stratification cavity, the valve is pressed against the valve closing seat with which it cooperates so as to prevent the gases in the combustion chamber from entering the stratification cavity.

If, on the contrary, the pressure in the combustion chamber is less than the pressure in the stratification cavity, said valve is pressed against the valve opening seat with which it cooperates so as to form a torch ignition pre-chamber, and to cause the stratification cavity to communicate with the combustion chamber via the gas ejection orifices that said pre-chamber has on its periphery.

One also understands from a reading of patent application No. FR 1750264 that it is advantageous for the volume formed by the combination of the stratification cavity and the stratification pipe to be very small in relation to the volume of the combustion chamber of the spark-ignition engine. Indeed, the pre-compression of the initiator charge by the compression means called for in said patent application is costly in terms of energy and reduces the overall efficiency of the spark-ignition engine. Consequently, the mass and pressure of said initiator charge must be minimized.

However, it is noted that a small volume created by the stratification cavity and the stratification pipe implies a low air flow available to actuate the valve when the gases contained in the primary chamber start to be compressed by the engine piston.

But at this precise moment, it is imperative for said valve to press against the valve closing seat with which it cooperates as quickly as possible so as to prevent the gases contained in the combustion chamber from entering the stratification pipe.

In order for the valve to effectively press against the valve closing seat within a sufficiently short amount of time, in spite of the small volume created by the stratification cavity and the stratification pipe, very small gas ejection orifices need to be provided. Indeed, said orifices must be sufficiently small and constitute a sufficiently effective barrier to the passage of the gases from the combustion chamber to the stratification cavity, and this to maximize the pressure difference between said chamber and said cavity and allow the valve to be actuated.

This is why the description of the operation of the invention of patent application No. FR 1750264 mentions a gas ejection orifice diameter measuring twelve hundredths of a millimeter, while the maximum total travel that the stratification valve may travel between the valve closing seat and the valve opening seat is fifteen hundredths of a millimeter.

Such a small diameter is of course given as a non-limiting example. Still, it reveals the need to generate enough of a pressure difference between, on the one hand, the valve cavity side, which is subjected to the pressure of the gases in the stratification cavity, and, on the other hand, the chamber side of said valve, which is subjected to the pressure of the gases in the combustion chamber.

Indeed, the description of the operation of the invention given in patent application No. FR 1750264 describes as an example that the initiator charge may only contain one point six percent of the fuel contained in the primary charge. This results in a very small total volume created by the stratification cavity and the stratification pipe. Said small volume implies that a small gas flow is established between the primary chamber and the stratification cavity when the gases contained in the primary chamber are compressed. For this reason, very small diameter gas ejection orifices are needed to produce enough force to actuate the valve.

Indeed, large-diameter gas ejection orifices would have the consequence of allowing too much gas coming from the primary chamber to enter the stratification cavity directly via said orifices. This excessive flow established in parallel with the flow needed to move the valve would be detrimental to the difference between the pressure applied to the cavity side of the valve and the pressure applied to the chamber side of said valve. Beyond a certain diameter of the gas ejection orifices, said valve can no longer be actuated.

However, very small diameter gas ejection orifices have a major drawback. Indeed, when the initiator charge is ignited in the stratification cavity, the resulting combustion abruptly increases the pressure in said cavity. This has the effect of pushing the valve and pressing it against the valve opening seat with which it cooperates.

When held in sealed contact with said seat, said valve creates the torch ignition pre-chamber with the stratification pipe such that the hot gases of the initiator charge can escape in the form of torches raised to high temperature via the gas ejection orifices, said torches then penetrating the volume of the combustion chamber of the motor and igniting the primary charge therein.

In order to ensure rapid combustion of said primary charge and to maximize the efficiency of the spark-ignition engine, it is necessary for said torches consisting of hot gases to penetrate the primary charge enough to reach the peripheral limits of the combustion chamber. However, for the same amount of penetration by said torches, the pressure to be produced in the ignition pre-chamber per torch grows larger as the diameter of the gas ejection orifices grows smaller.

If the gas ejection orifices are very small, a very high pressure needs to be produced in the ignition pre-chamber per torch in order to generate burning gas torches that penetrate far enough. To that end, the stratification injector needs to first introduce the initiator charge into the stratification cavity at a very high pressure, which implies that the compression means consume a large amount of energy. Consequently, very small gas ejection orifices reduce the potential of the invention of patent application No. FR 1750264 to improve the efficiency of the spark-ignition engine in which it is used.

Furthermore, the loss of efficiency is not the only drawback of very small gas ejection orifices, which are nevertheless indispensable for proper actuation of the valve. Indeed, the high pressure abruptly occurring after ignition of the initiator charge by the spark plug has the effect of violently pressing the valve against the valve opening seat with which it cooperates. The resulting impact compromises the longevity of both the valve and the seat and can even lead to premature destruction of said valve and said seat.

This is especially true given that, when compression starts in a spark-ignition engine, in order for the pressure to actuate the valve as effectively as possible, it is preferable to minimize the surface area of the valve opening seat so as to maximize the free surface area that the chamber side of the valve exposes to the pressure of the gases in the combustion chamber. Indeed, in order to pull said valve away from said seat, the pressure of said gases is only exerted on said free surface area.

But minimizing the surface area of the valve opening seat increases the specific power on the surface of the impact occurring between the valve and said seat, with said power being expressed, for example, in millijoules per square millimeter.

In addition, one notes that in practice there is nothing to soften the impact between the valve and the valve opening seat, which further aggravates the destructive consequences of said impact for both said valve and said seat.

Consequently, the design of the valve-type ignition pre-chamber according to patent application No. FR 1750264 can only be the result of the compromise between, on the one hand, the diameter of the gas ejection orifices and the surface area of the valve opening seat required to actuate the valve, and, on the other hand, the efficiency of the spark-ignition engine and the lifetime of the valve.

With the aim of avoiding said compromise and therefore maximizing the efficiency of any spark-ignition engine equipped with the valve-type ignition pre-chamber according to patent application No. FR 1750264, without compromising either the actuation or the lifetime of the valve, the magnetic valve recoil device according to the invention and a particular embodiment makes it possible to:

Always bring the valve back into contact with the valve closing seat with which it cooperates when the engine piston starts to compress the gases contained in the primary chamber, and this even if a small air flow is available to actuate said valve;

Soften the impact between the valve and the valve opening seat with which it cooperates, without compromising the actuation of said valve.

SUMMARY OF THE INVENTION

Bearing in mind the foregoing, the magnetic valve recoil device according to the invention and a special embodiment therefore makes it possible to:

Determine the diameter of the gas ejection orifices, the total volume created by the stratification cavity and the stratification pipe, and the injection pressure of the initiator charge in said cavity based solely on the criterion of better efficiency of the spark-ignition engine, and this without the dual requirement of valve actuation and durability;

Maximize the efficiency of the spark-ignition engine and the lifetime of the valve.

Just as the valve-type ignition pre-chamber of patent application No. FR 1750264 or the shuttle-electrode spark plug of patent application No. FR 1662254 to which it refers, the magnetic valve recoil device is designed to be inexpensive to mass-produce so as to be compatible with the economic constraints of most applications for which it is intended, including automobiles.

It is understood that the magnetic valve recoil device according to the invention may apply to any rotary or reciprocating internal-combustion spark-ignition engine, regardless of the type, regardless of whether the fuel it consumes is gaseous, liquid, or solid, and regardless of whether its primary charge is diluted with cooled EGR or not, with a neutral gas of any kind, or with an oxygen-rich gas or a gas containing any other oxidizer.

It is also understood that the initiator charge for igniting the primary charge of any spark-ignition engine equipped with the magnetic valve recoil device according to the invention may contain a fuel and/or an oxidizer other than the fuel and/or oxidizer of which said primary charge consists.

The other features of the present invention are described in the description and in the secondary claims which depend either directly or indirectly on the main claim.

The magnetic valve recoil device according to the present invention is intended for a valve-type ignition pre-chamber for an internal combustion engine, said engine comprising a cylinder head on top of a cylinder in order to form, together with a piston, a combustion chamber into which a primary charge may be introduced, said cylinder head receiving a stratification cavity to which, on the one hand, a stratification injector, which can inject an initiator charge, and, on the other hand, ignition means lead, said cavity being connected to the combustion chamber by a stratification pipe, while a stratification valve can either close said pipe and isolate the stratification cavity from the combustion chamber a surface on the cavity side of said valve, then resting on a valve closing seat by means of a cavity-side valve bearing surface, or create together with said pipe a torch ignition pre-chamber that causes the stratification cavity to communicate with the combustion chamber by means of at least one gas ejection orifice in said pre-chamber, a chamber-side surface that said valve has resting in this case on a valve opening seat via a chamber-side valve bearing surface, said device comprising:

At least one magnetic material constituting in whole or in part the stratification valve and the stratification pipe;

At least one source of a magnetic field of which the magnetic flux passes through the stratification valve and the stratification pipe so as to magnetize said valve and said pipe.

The magnetic valve recoil device according to the present invention comprises a source of a magnetic field which is a permanent magnet.

The magnetic valve recoil device according to the present invention comprises a source of a magnetic field which is a coil of conductive wire through which an electric current can flow.

The magnetic valve recoil device according to the present invention has an amperage of the electric current flowing through the coil of conductive wire that is controlled by a computer.

The magnetic valve recoil device according to the present invention comprises an end of the stratification pipe which receives the valve opening seat that consists of a part added to said pipe and made of a non-magnetic material.

The magnetic valve recoil device according to the present invention comprises a surface on the cavity side consisting of a circular peripheral recess forming an annular distribution chamber, with the outside diameter of the cavity-side valve bearing surface being equal to or less than the inside diameter of said annular chamber.

The magnetic valve recoil device according to the present invention has a diameter of the end of the stratification pipe leading to the combustion chamber that is greatly reduced locally so as to form a gas throttling orifice, said end thus forming, together with the surface on the chamber side, a valve damping chamber having a maximum volume when the cavity-side valve bearing surface is in contact with the valve closing seat with which it cooperates.

The magnetic valve recoil device according to the present invention comprises outside diameters of the chamber-side valve bearing surface and the valve opening seat which are close to the outside diameter of the stratification valve, while the inside diameters of said bearing surface and said seat are close to the diameter of the gas throttling orifice.

BRIEF DESCRIPTION OF THE DRAWINGS

The description which follows in connection with the appended drawings, given as non-limiting examples, will provide a better understanding of the invention, the features of the invention, and the advantages that the invention is likely to provide.

DESCRIPTION OF THE PREFERRED EMBODIMENTS

FIGS. 1 to 6 show magnetic valve recoil device 42 according to the invention, various details of the components, variations, and accessories thereof. Magnetic valve recoil device 42 is specially designed for valve-type ignition pre-chamber 1, such as that described in patent application No. FR 1750264, or for a shuttle-electrode spark plug such as that described in French patent application No. FR 1662254.

Figure 1:
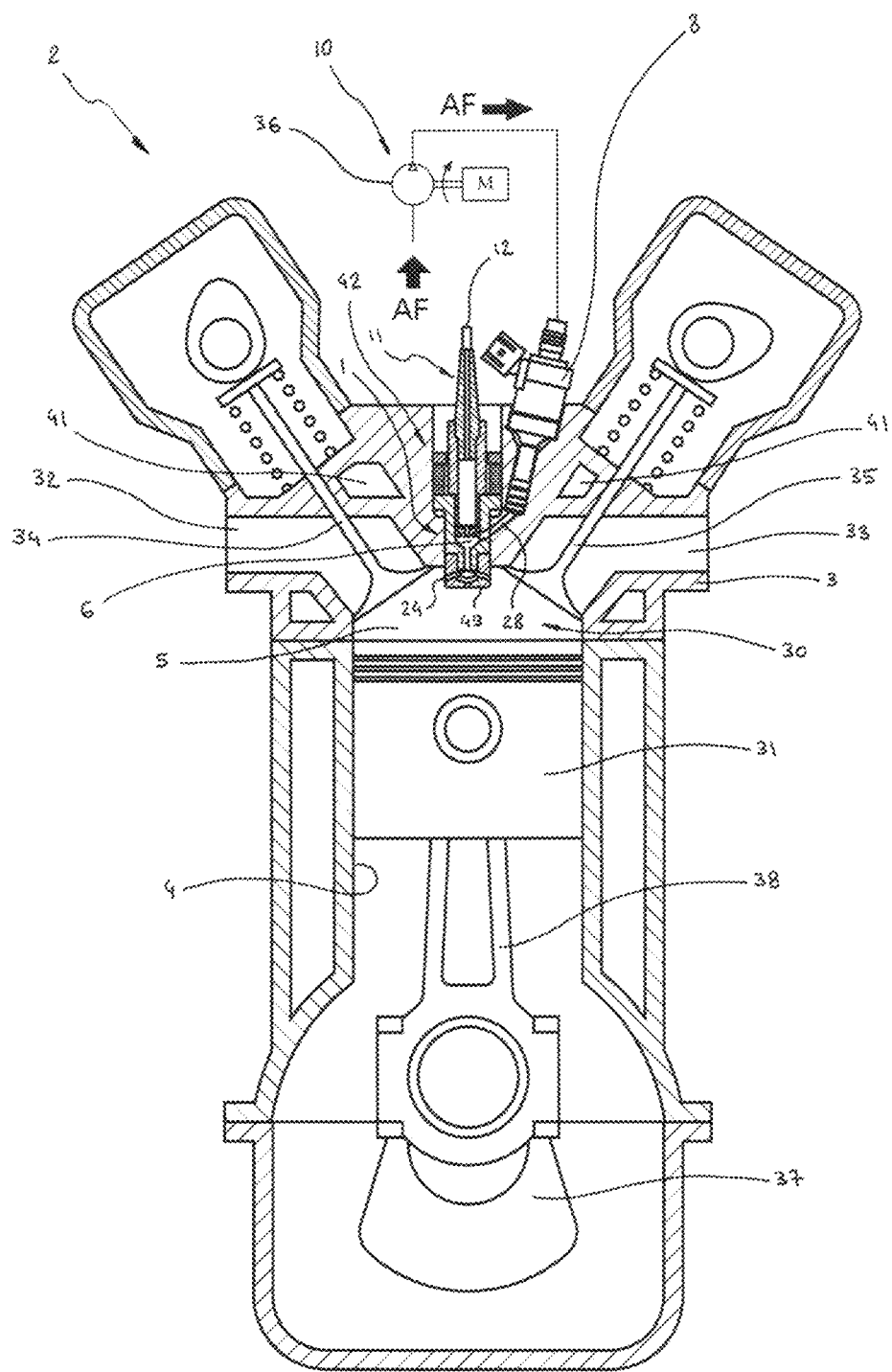
FIG. 1 is a schematic cross-sectional view of the magnetic valve recoil device according to the invention as it may be installed in the cylinder head of an internal combustion engine.

One can see in FIG. 1 that magnetic valve recoil device 42 is designed in particular for an internal combustion engine 2 comprising a cylinder head 3 on top of a cylinder 4 so as to form, together with piston 31, a combustion chamber 5 into which a primary charge 30 can be introduced, said cylinder head 3 receiving a stratification cavity 6 to which, on the one hand, a stratification injector 8, which can inject an initiator charge 9, and, on the other hand, ignition means 11 lead.

Note that stratification injector 8 may be of any type without restriction, and may consist of any apparatus capable of introducing an initiator charge 9 into stratification cavity 6 by any means whatsoever, and this regardless of whether oxidizer-fuel mixture AF containing said initiator 9 is formed upstream or downstream of said stratification injector 8 with the possible help of another injector of either gas or liquid, or with the help of a carburetor known per se.

Figure 2:
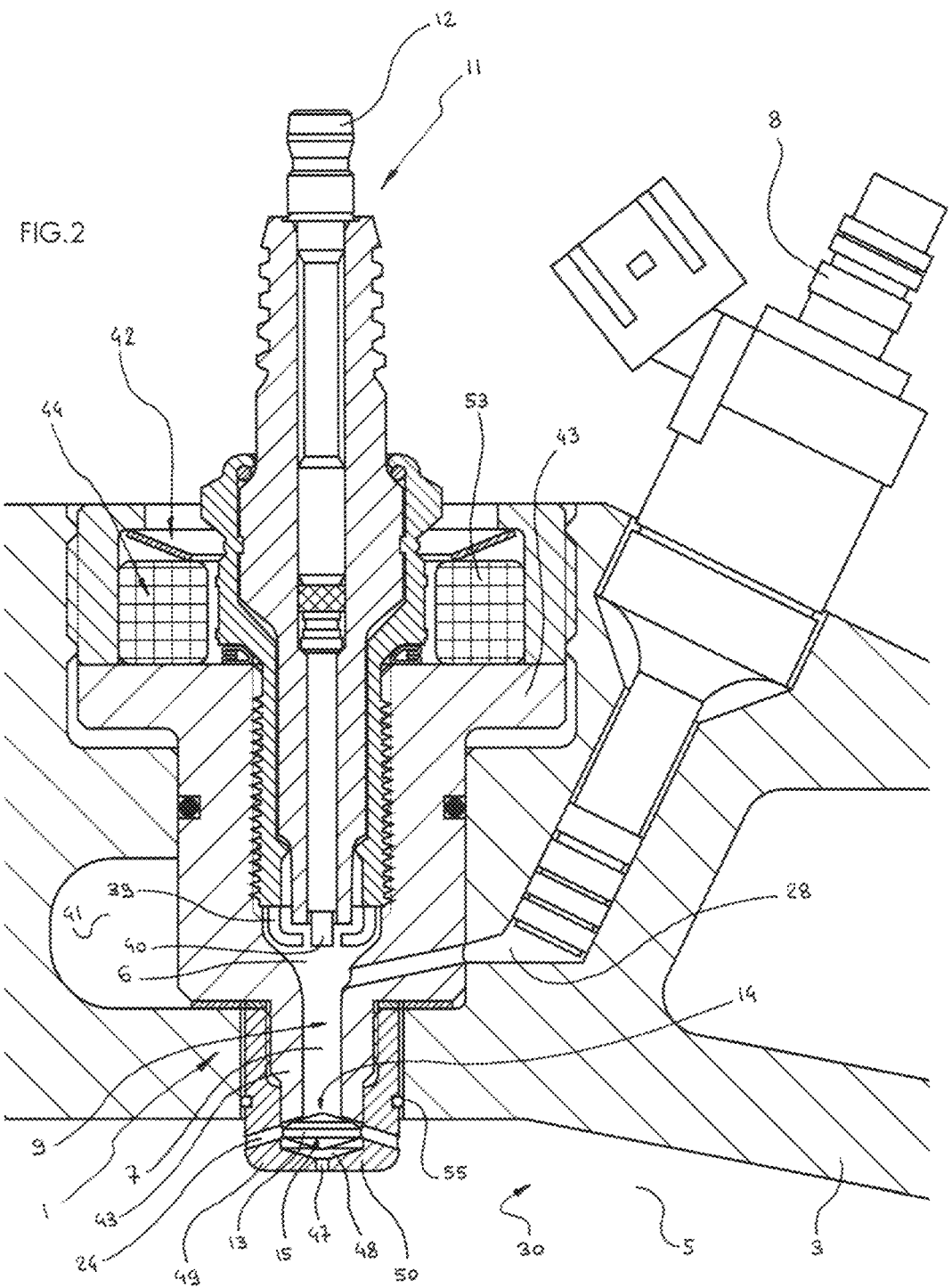
FIG. 2 is a schematic cross-sectional view of the magnetic valve recoil device according to the invention in which the magnetic field source consists of a permanent magnet.
Figure 3:
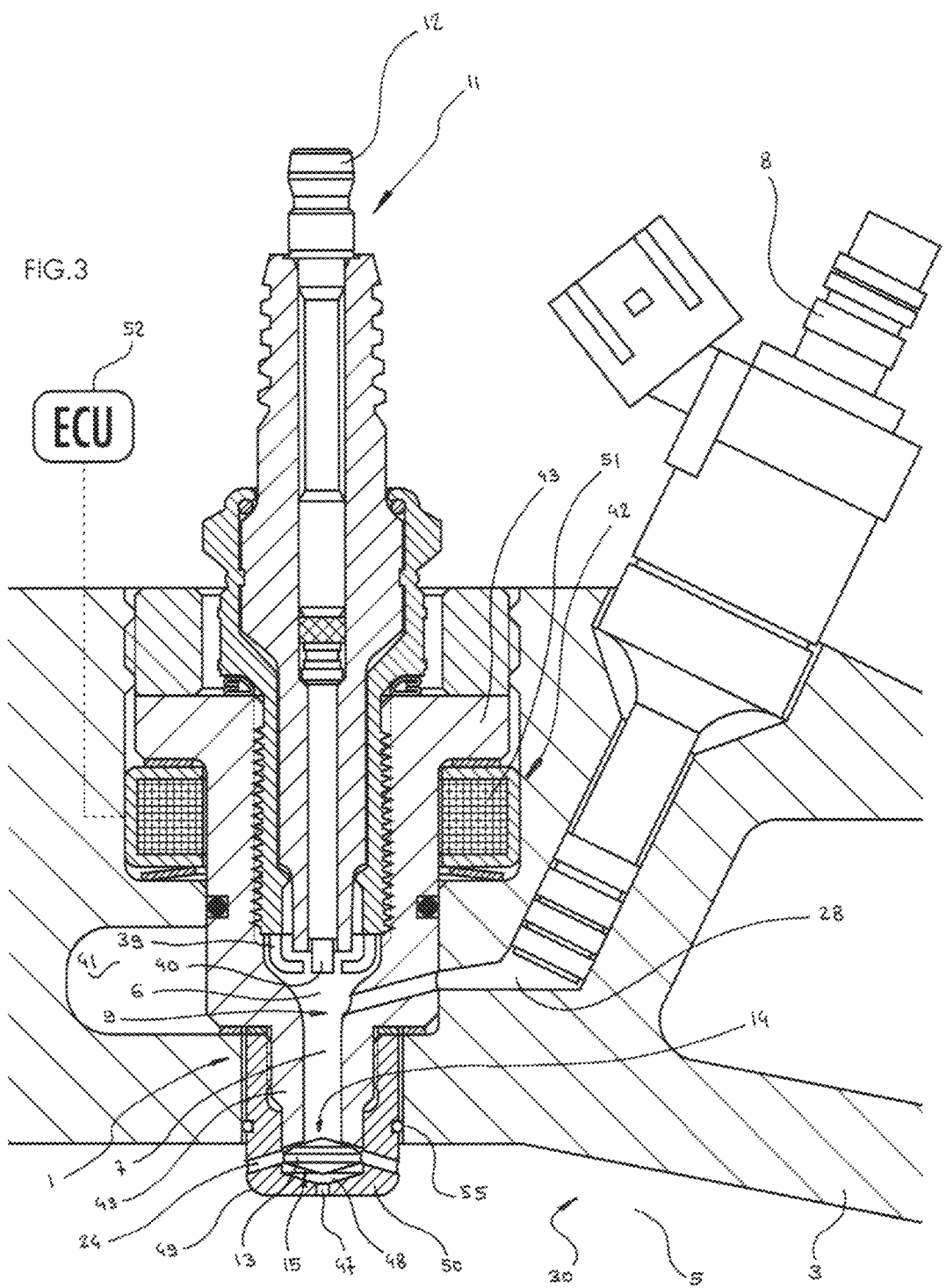
FIG. 3 is a schematic cross-sectional view of the magnetic valve recoil device according to the invention in which the magnetic field source consists of a coil of conductive wire through which an electric current can flow.

One can notice in FIGS. 2 and 3 that stratification cavity 6 is connected to combustion chamber 5 by a stratification pipe 7, while a stratification valve 13 can either close said pipe 7 and isolate stratification cavity 6 from combustion chamber 5 a surface on cavity side 14 of said valve 13, then resting on a valve closing seat 18 by means of a cavity-side valve bearing surface 19, or create together with said pipe 7 a torch ignition pre-chamber 23 that causes stratification cavity 6 to communicate with combustion chamber 5 by means of at least one gas ejection orifice 24 in said pre-chamber 23, a chamber-side surface 15 that said valve 13 has, resting in this case on a valve opening seat 20 via a chamber-side valve bearing surface 21.

FIGS. 2 to 6 show that magnetic valve recoil device 42 according to the invention comprises at least one magnetic material 43 that constitutes in whole or in part stratification valve 13 and stratification pipe 7, said material 43 consisting, for example, of steel or soft iron.

FIGS. 2 to 6 also show that magnetic valve recoil device 42 comprises at least one magnetic field source 44, the magnetic flux 54 of which passes through stratification valve 13 and stratification pipe 7 so as to magnetize said valve 13 and said pipe 7 so that said pipe 7 and said valve 13 are drawn to each other, which tends to press the cavity-side valve bearing surface 19 against valve closing seat 18 with which it cooperates.

As shown in FIG. 2, magnetic field source 44 may be a permanent magnet 53 known per se, made for example of ferrite, neodymium-iron-boron, samarium-cobalt, or aluminum-nickel-cobalt.

As an alternative shown in FIG. 3, magnetic field source 44 may be a coil of conductive wire 51 through which an electric current can flow. In this case, the amperage of the electric current flowing through coil of conductive wire 51 may be controlled by a computer 52, which can adapt the recoil power of stratification valve 13 to its valve closing seat 18 or control said recoil with all or nothing, and this for example during the seven hundred and twenty degrees of rotation of the crankshaft during which the four strokes of internal combustion engine 2 take place, and/or bearing in mind the speed and load of said engine 2.

FIGS. 1 to 6 show that the end of stratification pipe 7 that receives valve opening seat 20 may be a part 49 that is added to said pipe 7, consisting of a non-magnetic material 50 such as stainless steel or Inconel, so that stratification valve 13 is drawn in the direction of valve closing seat 18 with which it cooperates, and not in the direction of valve opening seat 20.

As a variant of magnetic valve recoil device 42 according to the invention, cavity-side surface 14 may comprise a circular peripheral recess 45 forming an annular distribution chamber 46.

In this case, the outside diameter of cavity-side valve bearing surface 19 is equal to or less than the inside diameter of said annular chamber 46, while the gases coming from stratification cavity 6 are distributed in said annular distribution chamber 46 before being injected into combustion chamber 5 via torch ignition pre-chamber 23 and gas ejection orifices 24, and this after initiator charge 9 has been ignited by ignition means 11.

Note that annular distribution chamber 46 makes it possible to limit the travel of stratification valve 13 without significantly limiting the gas flow taking place from stratification cavity 6 to torch ignition pre-chamber 23.

This makes it possible, on the one hand, to keep a sufficient attractive magnetic force between stratification valve 13 and stratification pipe 7, and, on the other hand, to ensure that said valve 13 is always pressed against valve closing seat 18 in parallel with the latter, without ever being able to remain stuck across stratification pipe 7 owing to the fact that, at valve closing seat 18, the magnetic field lines are not perpendicular to the surface of said seat 18.

Note that in FIGS. 1 to 6, according to a variant of valve magnetic recoil device 42 of the invention, the diameter of the end of stratification pipe 7 leading to combustion chamber 5 may be greatly reduced locally so as to form a gas throttling orifice 47, said end thus forming, together with chamber-side surface 15, a valve damping chamber 48, the volume of which is maximum when cavity-side valve bearing surface 19 is in contact with valve closing seat 18 with which it cooperates.

According to this variant, valve damping chamber 48 is advantageously provided to limit the power of the impact when chamber-side valve bearing surface 21 comes into contact with valve opening seat 20 with which it cooperates.

The impact power is limited by the fact that the pressure of the gases trapped in the damping chamber rises due to the effect of movement of stratification valve 13 toward valve opening seat 20, with said gases thus slowing stratification valve 13 before escaping through gas throttling orifice 47.

As a refinement of this variant, the outside diameters of chamber-side valve bearing surface 21 and valve opening seat 20 may be close to the outside diameter of stratification valve 13, while the inside diameters of said bearing surface 21 and said seat 20 are close to the diameter of gas throttling orifice 47.

Note that this particular arrangement of magnetic valve recoil device 42 according to the invention makes it possible to maximize the efficiency of valve damping chamber 48 in damping the impacts occurring between chamber-side valve bearing surface 21 and valve opening seat 20 with which it cooperates. This is a result of the flushing effect of the gases which occurs between said bearing surface 21 and said seat 20 when they are very close to each other.

The improvements and refinements described above and which are part of the magnetic valve recoil device 42 according to the invention apply to the inventions of patent applications FR 1750264 and FR 1662254 even when said inventions occur in the form of a spark plug directly incorporating either a valve or a shuttle electrode.

Note that magnetic valve recoil device 42 according to the invention is particularly well suited to cylinder heads 3 made of non-magnetic aluminum alloy, which is common in the automobile industry. Indeed, when applied to such cylinder heads 3, the operation of said device 42 is disrupted little or not at all by its environment.

OPERATION OF THE INVENTION

The operation of magnetic valve recoil device 42 according to the invention, intended for a valve-type ignition pre-chamber 1, is readily understood in light of FIGS. 1 to 6.

One can see in FIG. 1 that, according to a non-limiting embodiment of magnetic valve recoil device 42, the device may be implemented in an internal combustion engine 2 having a valve-type ignition pre-chamber 1 as described in patent application No. FR 1750264.

Note that, as shown in FIGS. 2 and 3, said pre-chamber 1 includes notably a stratification cavity 6 in which lead ignition means 11 and a stratification injector 8, a stratification pipe 7, and a stratification valve 13.

Figure 6:
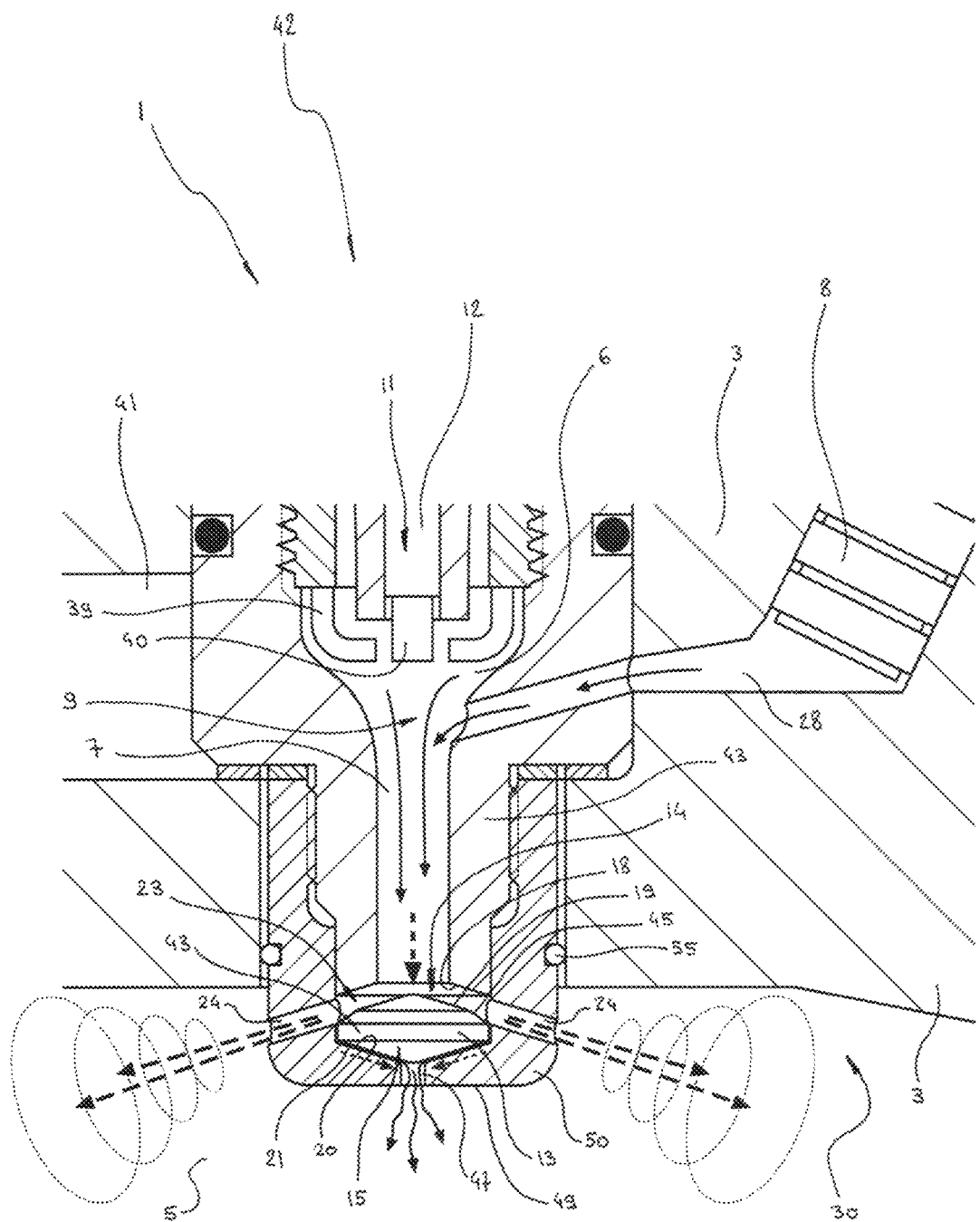

Note that in FIG. 6 stratification valve 13 can constitute a torch ignition pre-chamber 23 with stratification pipe 7, said pre-chamber 23 communicating simultaneously with stratification cavity 6, on the one hand, and with combustion chamber 5 included in internal combustion engine 2 via gas ejection orifices 24, on the other hand.

In addition to said pre-chamber 1, one can see in FIG. 1 that said engine 2 comprises a cylinder head 3 which includes cooling water jackets 41 and which sits on top of a cylinder 4 so as to form with a piston 31 combustion chamber 5 in which a primary charge 30 can be burned.

Note that in FIG. 1 piston 31 is connected to crankshaft 37 by means of a rod 38, said piston 31 imparting to crankshaft 37 a rotational movement when said piston 31 is driven by a reciprocating translational movement in cylinder 4.

One can also see in FIG. 1 that combustion chamber 5 can be made to communicate with an intake duct 32 through intake valve 34, said chamber 5 also being able to be placed in communication with an exhaust pipe 33 through an exhaust valve 35.

FIGS. 1 to 6 considered as a non-limiting example for illustrating the operation of magnetic valve recoil device 42 according to the invention, show that ignition means 11 consist of an ignition spark plug 12 known per se, of which the grounding electrodes 39 and center electrode 40 lead to stratification cavity 6. Also note in FIGS. 1 to 3 stratification injector 8 which can inject an initiator charge 9 in stratification cavity 6 via an injector outlet pipe 28.

In FIG. 1, one can see that a stratification compressor 36 constitutes compression means 10 for pressurizing a readily inflammable oxidizer-fuel mixture AF which forms an initiator charge 9, said charge being intended to be injected into stratification cavity 6 by stratification injector 8.

With the underlying principle of valve-type ignition pre-chamber 1 remaining unchanged with respect to that described in patent application No. FR 1750264, we shall now focus on the characteristics provided by magnetic valve recoil device 42 of the invention in the operation of said pre-chamber 1.

In describing in detail the operation of magnetic valve recoil device 42 according to the invention, we will assume that magnetic field source 44 consists of a permanent magnet 53 as shown in FIG. 2.

We shall furthermore choose the embodiment example shown in FIGS. 1 to 6 in which one can see that valve opening seat 20 is an added part 49 on stratification pipe 7, said part 49 being made of a non-magnetic material 50—in the present case stainless steel, while cavity-side surface 14 of stratification valve 13 comprises a peripheral circular recess 45 forming an annular distribution chamber 46.

Note that in FIGS. 2 to 6 added part 49 advantageously comprises a cooling ring 55 which allows it to cool effectively in contact with cylinder head 3, with said ring 55 forming a thermal bridge between said part 49 and said cylinder head 3.

Note that in FIGS. 2 to 6 at least stratification cavity 6 and stratification pipe 7 may consist of a single part made of magnetic material 43, the exterior wall of which is entirely or partly in contact with a cooling liquid circulating in cooling water jackets 41 made in cylinder head 3.

To illustrate the operation of magnetic valve recoil device 42, we shall also choose the particular configuration shown in FIGS. 1 to 6, according to which the diameter of the end of stratification pipe 7 leading to combustion chamber 5 is greatly reduced locally in order to form a gas throttling orifice 47 forming, together with said pipe 7 and chamber-side surface 15 of stratification valve 13, a valve damping chamber 48.

Furthermore, we shall choose the variant of said configuration, which requires that the outside diameters of chamber-side valve bearing surface 21 and valve opening seat 20 are close to the outside diameter of stratification valve 13, while the inside diameters of said bearing surface 21 and said seat 20 are close to the diameter of gas throttling orifice 47.

Figure 4:
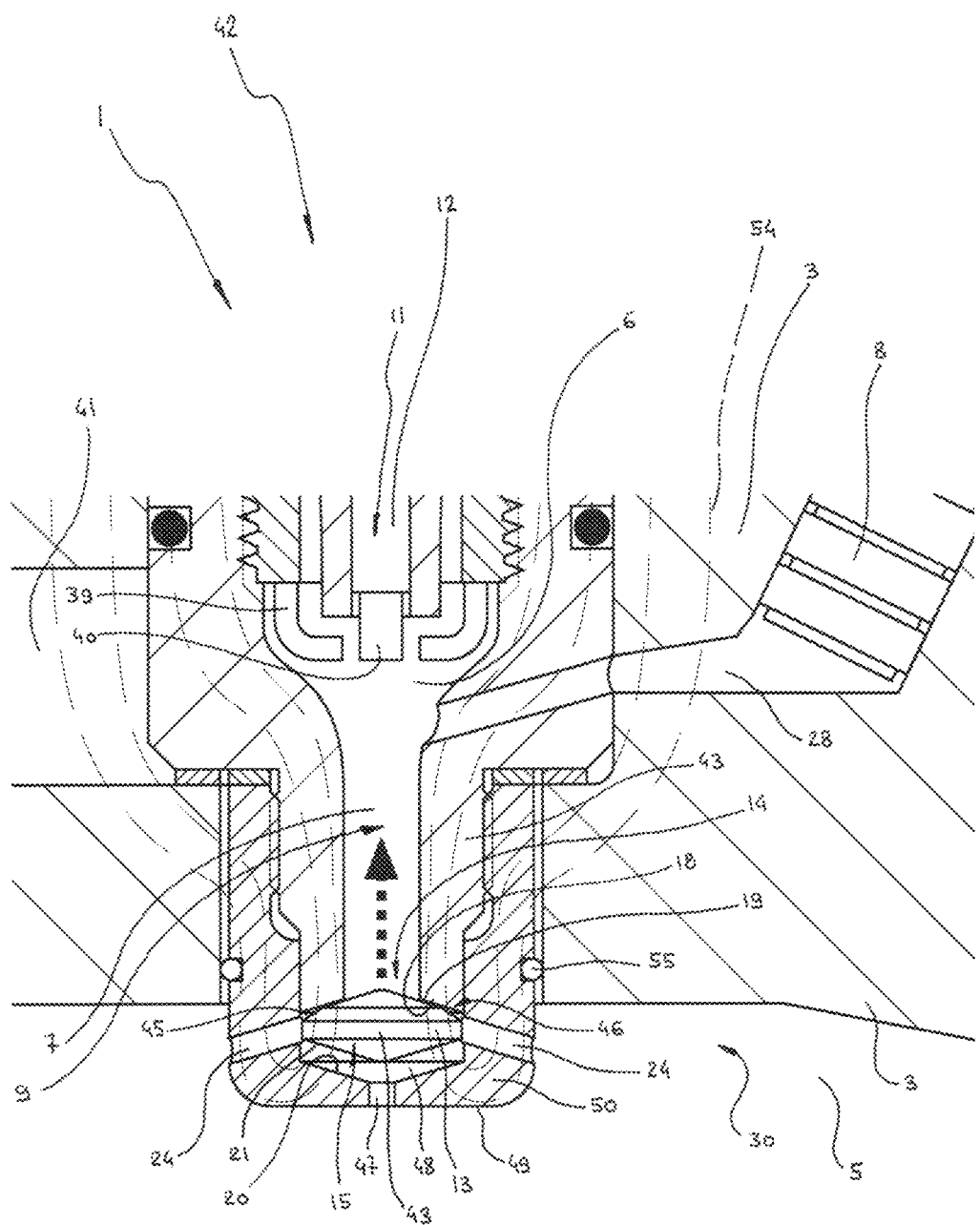
FIGS. 4 to 6 are partial close-up schematic cross-sectional views of the magnetic valve recoil device according to the invention, said views showing certain phases of the operation of said device.

FIG. 4 shows that according to magnetic valve recoil device 42 of the invention, magnetic flux 54—symbolized here by long dotted lines—is channeled by magnetic material 43 of which stratification valve 13 and stratification pipe 7 are made, which, in the present case and in this non-limiting example, is steel.

When thus magnetized, stratification valve 13 and stratification pipe 7 are drawn to each other in such a way that valve 13 has a natural tendency to be pressed against valve closing seat 18 with which it cooperates.

With the end of stratification pipe 7 that receives valve opening seat 20 being an added part 49 made of a non-magnetic material 50, stratification valve 13 is drawn only in the direction of valve closing seat 18 with which it cooperates, and not in the direction of valve opening seat 20.

The result is that, contrary to what is described in patent application No. FR 1750264, the effect of magnetic valve recoil device 42 is that stratification valve 13 closes off stratification pipe 7 not only because the pressure in combustion chamber 11 is greater than the pressure in stratification cavity 6, but also because said valve 13 is drawn in that direction by the magnetic field to which it is subjected by permanent magnet 53, which is clearly shown in FIG. 4.

Bearing in mind the foregoing, one notes that magnetic valve recoil device 42 according to the invention makes it possible to determine the total volume formed by stratification cavity 6 and stratification pipe 7, on the one hand, and the diameter of gas ejection orifices 24, on the other hand, based solely on the criterion of better efficiency of internal combustion engine 2 and not on a need for actuation of stratification valve 13.

Consequently, these choices can be made without the pressure difference needed for stratification valve 13 to close stratification pipe 7 being an excessively determining factor, particularly at the beginning of the compression of primary charge 30 after entering combustion chamber 5 through intake valve 34.

Apart from a great deal of freedom in optimizing the efficiency of internal combustion engine 2, magnetic valve recoil device 42 according to the invention results in a lesser sensitivity of the operation of stratification valve 13 to the rotational speed of said motor 2, since obtaining the pressure difference required for said valve 13 to close stratification pipe 7 is, according to patent application No. FR 1750264, largely dependent on said speed.

Consequently, as can be easily deduced from FIG. 4, magnetic valve recoil device 42 according to the invention calls for stratification pipe 7 to be closed off by stratification valve 13 not only as a result of the pressure difference between the pressure in combustion chamber 5 and the pressure in stratification cavity 6, as called for by the invention described in patent application No. FR 1750264, but also as a result of the magnetic recoil force exerted by permanent magnet 53 on stratification valve 13.

Figure 5:
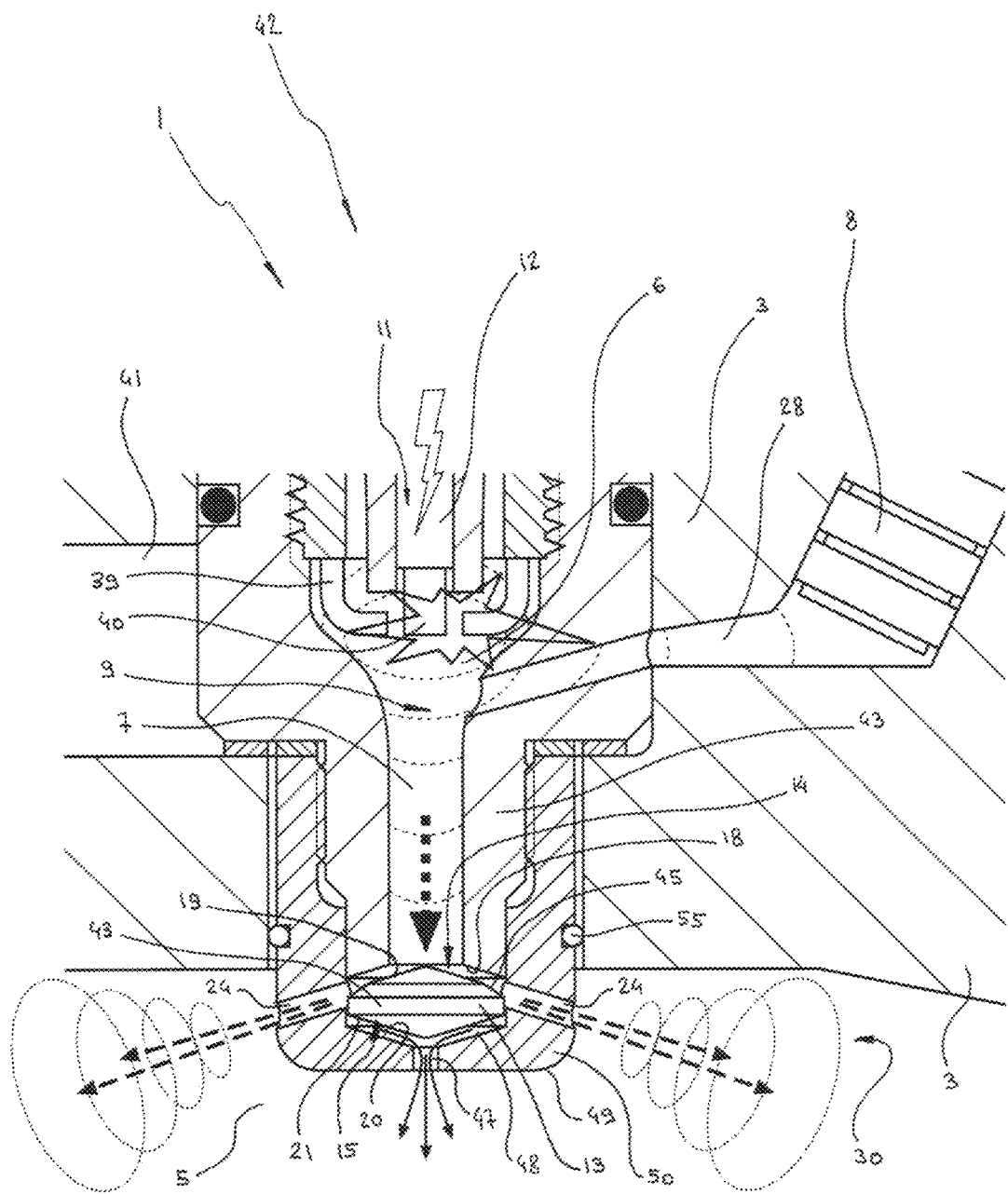

Note that the magnetic recoil force has practically no effect on proper opening of stratification pipe 7 by stratification valve 13 when initiator charge 9 is ignited by spark plug 12, as shown in FIG. 5. Indeed, after ignition the force to which the pressure of the combustion gases in stratification cavity 6 subjects cavity-side surface 14 of said valve 13 is considerably higher than the magnetic recoil force exerted by permanent magnet 53 on said valve 13.

Note that the lesser dependence of the closing of stratification pipe 7 by stratification valve 13 on the difference between the pressure exerted on cavity-side surface 14 and the pressure exerted on chamber-side surface 15 of said valve 13 also makes it possible to more freely determine the diameter of the termination of stratification pipe 7 leading to combustion chamber 5.

Indeed, the invention of patent application No. FR 1750264 requires that chamber-side surface 15 exposes as great a surface as possible to the pressure of the gases contained in combustion chamber 5 to allow for proper actuation of stratification valve 13 when it needs to close stratification pipe 7, particularly at the beginning of compression of primary charge 30 previously admitted into combustion chamber 5 via intake valve 34. To achieve that, the radial length of valve opening seat 20 with which chamber-side valve bearing surface 21 cooperates, must be made as small as possible.

To the extent that recoil to closing of stratification pipe 7 by stratification valve 13 is now only marginally dependent on the pressure of the gases and is mostly assured by the attractive magnetic force generated by permanent magnet 53, it is possible to greatly reduce the surface exposed to the pressure of the gases on chamber-side surface 15 when chamber-side valve bearing surface 21 is in contact with valve opening seat 20 with which it cooperates. This is achieved by greatly increasing the radial length of valve opening seat 20 to the point that what remains of the end of stratification pipe 7 leading into combustion chamber 5 is nothing more than a small-diameter gas throttling orifice 47 as shown in FIGS. 1 to 6.

This particular configuration made possible by magnetic valve recoil device 42 according to the invention, makes it possible to create a valve damping chamber 48 having a maximum volume when cavity-side valve bearing surface 19 is in contact with valve closing seat 18 with which it cooperates, as shown in FIGS. 1 to 4.

Note that valve damping chamber 48 is an advantageous consequence of magnetic valve recoil device 42 according to the invention, said chamber 48 being decisive in making stratification valve 13 very robust and having a long lifetime.

Indeed, as shown in FIG. 5, when stratification valve 13 moves in the direction of valve opening seat 20 following ignition of initiator charge 9 by spark plug 12, said valve 13 expels the gases contained in valve damping chamber 48 toward combustion chamber 5 via gas throttling orifice 47.

In so doing, said valve 13 causes a "flushing effect" that expels the gases trapped between chamber-side valve bearing surface 21 and valve opening seat 20 toward gas throttling orifice 47. Said "flushing effect" slows down said valve 13.

In addition, gas throttling orifice 47 slows down the flow of gases from valve damping chamber 48 to combustion chamber 5, which helps to slow down stratification valve 13.

Note that the slowing down of stratification valve 13 resulting from the "flushing effect" and the gas throttling is all the more intense as chamber-side valve bearing surface 21 is close to valve opening seat 20 with which it cooperates.

This particularity makes it possible, in an initial moment shown in FIG. 5, to ensure a quick movement of stratification valve 13 toward valve opening seat 20 in order to form torch ignition pre-chamber 23 and eject the burning gases resulting from the combustion of initiator charge 9 via gas ejection orifices 24, so as to ignite primary charge 30. In a subsequent moment shown in FIG. 6, said particularity ensures that chamber-side valve bearing surface 21 comes to rest gently on valve opening seat 20, so as to endow stratification valve 13 with maximum durability. Note that in order to come back into contact with valve closing seat 18 by means of its cavity-side valve bearing surface 19, stratification valve 13 has a lot of time because as soon as initiator charge 9 has finished burning and most of the gases in the charge have been ejected in the form of torches raised to high temperature via gas ejection orifices 24, the pressure in combustion chamber 5 rapidly becomes greater than the pressure in stratification cavity 6.

Consequently, through the combined effect of this pressure difference and the magnetic recoil force exerted by permanent magnet 53 on stratification valve 13, the latter returns to contact with valve closing seat 18 in a few degrees of rotation of crankshaft 37 by means of its cavity-side valve bearing surface 19.

Next, as long as ignition of a new initiator charge 9 is not been triggered, stratification valve 13 can open slightly to allow a few cubic millimeters of gas to pass from stratification pipe 7 to combustion chamber 5, but without totally opening. The result of this situation is that stratification valve 13 remains primarily in contact with valve closing seat 18, ready to start another four-stroke thermodynamic cycle of internal combustion engine 2, a cycle which can be considered to start at the moment when a new primary charge 30 is introduced into combustion chamber 5 by intake valve 34.

Note that by keeping stratification valve 13 in contact with valve closing seat 18 with which it cooperates for most of the time, magnetic valve recoil device 42 according to the invention limits the intrusion of residual burnt gases from primary charge 30 into stratification cavity 6 at the beginning of compression of said charge 30. This works in favor of a maximum efficacy of initiator charge 9 to ignite primary charge 30.

As described earlier, cavity-side surface 14 may advantageously include a peripheral circular recess 45 which forms an annular distribution chamber 46, with the outside diameter of cavity-side valve bearing surface 19 then being equal to or less than the inside diameter of said annular chamber 46. Annular distribution chamber 46 in question is especially visible in FIG. 4.

This particular configuration of magnetic valve recoil device 42 according to the invention makes it possible to limit the travel of stratification valve 13 without significantly limiting the gas flow that is established after ignition of initiator charge 9 from stratification cavity 6 to torch ignition pre-chamber 23.

Since the magnetic attraction force exerted by stratification pipe 7 on stratification valve 13 is approximately inversely proportional to the square of the distance between said valve 13 and said pipe 7, reducing the travel of said valve 13 by thirty percent makes it possible to double said force with the same power of permanent magnet 53 when chamber-side valve bearing surface 21 is in contact with valve opening seat 20 with which it cooperates.

In addition, the reduced travel of stratification valve 13 that is afforded by annular distribution chamber 46 without compromising proper flow of the gases makes it possible to ensure that said valve 13 is always pressed against valve closing seat 18 with which it cooperates in parallel with the latter, without running the risk of remaining stuck across stratification pipe 7 owing to the fact that, at valve closing seat 18, the magnetic field lines are not normal to the surface of said seat 18.

Note that magnetic valve recoil device 42 according to the invention does not in any way lessen the performance of the inventions of patent applications FR 1750264 and FR 1662254 to which it applies advantageously. On the contrary, it substantially improves the efficiency thereof.

Also note that magnetic valve recoil device 42 according to the invention can apply to fields other than internal combustion engines, such as gas nailers, firearms, or any other device requiring the ignition of a primary charge by means of an initiator charge with the best possible efficiency.

The possibilities of magnetic valve recoil device 42 according to the invention are not limited to the applications that have just been described and it must furthermore be understood that the foregoing description is only given as an example and does not in any way limit the field of said invention, which would not be exceeded by replacing the described embodiment details with any equivalent ones.

The invention claimed is:

1. A magnetic valve recoil device (42) for a valve-type ignition pre-chamber (1) for an internal combustion engine (2), said engine comprising a cylinder head (3) sitting on top of a cylinder (4) in order to form, together with a piston (31), a combustion chamber (5) into which a primary charge (30) may be introduced, said cylinder head (3) receiving a stratification cavity (6) to which, on the one hand, a stratification injector (8), which can inject an initiator charge (9), and, on the other hand, ignition means (11) lead, said cavity (6) being connected by a stratification pipe (7) to the combustion chamber (5) while a stratification valve (13) can either close said pipe (7) and isolate the stratification cavity (6) from the combustion chamber (5), with a cavity-side surface (14) of said valve (13) then resting on a valve closing seat (18) by means of a cavity-side valve bearing surface (19), or form, together with said pipe (7), a torch ignition pre-chamber (23) that causes the stratification cavity (6) to communicate with the combustion chamber (5) by means of at least one gas ejection orifice (24) that said pre-chamber (23) includes, with a chamber-side surface (15) of said valve (13) resting in this case on a valve opening seat (20) by means of a chamber-side valve bearing surface (21), characterized in that said device comprises:
- At least one magnetic material (43) constituting in whole or in part the stratification valve (13) and the stratification pipe (7);
- At least one source of a magnetic field (44) the magnetic flux (54) of which passes through the stratification valve (13) and the stratification pipe (7) so as to magnetize said valve (13) and said pipe (7).

2. A magnetic valve recoil device according to claim 1, characterized in that the magnetic field source (44) is a permanent magnet (53).

3. A magnetic valve recoil device according to claim 1, characterized in that the magnetic field source (44) is a coil of conductive wire (51) through which an electric current can flow.

4. A magnetic valve recoil device according to claim 3, characterized in that the amperage of the electric current flowing through the coil of conductive wire (51) is controlled by a computer (52).

5. A magnetic valve recoil device according to claim 1, characterized in that the end of the stratification pipe (7) which receives the valve opening seat (20) is a part (49) that is added to said pipe (7) and consists of a non-magnetic material (50).

6. A magnetic valve recoil device according to claim 1, characterized in that the cavity-side surface (14) comprises a circular peripheral recess (45) forming an annular distribution chamber (46), with the outside diameter of the cavity-side valve bearing surface (19) being equal to or less than the inside diameter of said annular chamber (46).

7. A magnetic valve recoil device according to claim 1, characterized in that the diameter of the end of the stratification pipe (7) leading to the combustion chamber (5) is greatly reduced locally so as to form a gas throttling orifice (47), said end thus forming, together with the chamber-side surface (15), a valve damping chamber (48) having a maximum volume when the cavity-side valve bearing surface (19) is in contact with the valve closing seat (18) with which it cooperates.

8. A magnetic valve recoil device according to claim 7, characterized in that the outside diameters of the chamber-side valve bearing surface (21) and the valve opening seat (20) are close to the outside diameter of the stratification valve (13), while the inside diameters of said bearing surface (21) and said seat (20) are close to the diameter of gas throttling orifice (47).

* * * * *